US012578467B2

(12) United States Patent
Ryu et al.

(10) Patent No.: US 12,578,467 B2
(45) Date of Patent: Mar. 17, 2026

(54) LIGHT DETECTION AND RANGING (LIDAR)-BASED INSPECTION DEVICE AND METHOD OF MANUFACTURING SEMICONDUCTOR DEVICE

(71) Applicant: SAMSUNG ELECTRONICS CO., LTD., Suwon-si (KR)

(72) Inventors: Sungyoon Ryu, Seoul (KR); Younghoon Sohn, Seoul (KR); Yusin Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1004 days.

(21) Appl. No.: 17/722,764

(22) Filed: Apr. 18, 2022

(65) Prior Publication Data

US 2023/0108333 A1    Apr. 6, 2023

(30) Foreign Application Priority Data

Oct. 6, 2021    (KR) ......................... 10-2021-0132698

(51) Int. Cl.
*G01C 3/08* (2006.01)
*G01S 17/18* (2020.01)
*G01S 17/26* (2020.01)

(52) U.S. Cl.
CPC .............. *G01S 17/18* (2020.01); *G01S 17/26* (2020.01)

(58) Field of Classification Search
CPC .................................. G01S 17/18; G01S 17/26
See application file for complete search history.

(56) References Cited

U.S. PATENT DOCUMENTS

| | | | |
|---|---|---|---|
| 7,535,555 B2 | 5/2009 | Nishizawa et al. | |
| 8,670,108 B2 | 3/2014 | Kim et al. | |
| 2020/0378835 A1 | 12/2020 | Sun et al. | |

(Continued)

FOREIGN PATENT DOCUMENTS

| | | | | |
|---|---|---|---|---|
| CN | 110274880 A | * | 9/2019 | ............. G01N 21/27 |
| JP | 2008-2815 A | | 1/2008 | |
| JP | 5949341 B2 | | 7/2016 | |

(Continued)

OTHER PUBLICATIONS

Communication dated Dec. 16, 2025 issued by the Korean Ministry of Intellectual Property in Korean Patent Application No. 10-2021-0132698.

*Primary Examiner* — Mark Hellner

(74) *Attorney, Agent, or Firm* — Sughrue Mion, PLLC

(57) ABSTRACT

Provided is a light detection and ranging (LiDAR)-based inspection device including an ultrafast pulse source configured to generate a first ultrafast pulse and a second ultrafast pulse each having a pulse width ranging from 1 fs to 100 fs, a stage configured to generate a gating signal by adjusting a distance of flight of the first ultrafast pulse, a dispersing device configured to generate a chirp signal, based on the second ultrafast pulse reflected from a specimen, the chirp signal including a plurality of pulses having different wavelengths, a nonlinear optical generator configured to generate a nonlinear optical signal based on the chirp signal and the gating signal, and a detector configured to detect the nonlinear optical signal, wherein the gating signal temporally overlaps with some of the plurality of pulses included in the chirp signal in the nonlinear optical generator.

20 Claims, 4 Drawing Sheets

(56)                  References Cited

U.S. PATENT DOCUMENTS

2022/0236416 A1 *  7/2022  Takahashi ............... G01S 7/486

FOREIGN PATENT DOCUMENTS

| KR | 10-1109001 | B1 | 1/2012 | |
| KR | 1109001 | B1 * | 1/2012 | .......... G01B 11/026 |
| KR | 10-1272908 | B1 | 6/2013 | |
| KR | 10 2015 0045735 | A | 4/2015 | |
| KR | 10-1642952 | B1 | 7/2016 | |
| KR | 10-2018-0097333 | A | 8/2018 | |
| KR | 10 2018 0128447 | A | 12/2018 | |
| KR | 10-2010172 | B1 | 8/2019 | |
| KR | 10 2021 0074987 | A | 6/2021 | |
| KR | 10 2021 0088987 | A | 7/2021 | |

* cited by examiner

10

11

12

| WAFER PROCESSING DEVICE | → | LiDAR-BASED INSPECTION DEVICE |

PROCESS WAFER —P110

INSPECT WAFER —P120

LIGHT DETECTION AND RANGING (LIDAR)-BASED INSPECTION DEVICE AND METHOD OF MANUFACTURING SEMICONDUCTOR DEVICE

CROSS-REFERENCE TO RELATED APPLICATION

This application is based on and claims priority under 35 U. S. C. § 119 to Korean Patent Application No. 10-2021-0132698, filed on Oct. 6, 2021, in the Korean Intellectual Property Office, the disclosure of which is incorporated by reference herein in its entirety.

BACKGROUND

Example embodiments of the present disclosure relate to a light detection and ranging (LiDAR)-based inspection device and a method of manufacturing a semiconductor device.

LiDAR refers to a remote analysis technology using light and has an operational principle similar to that of radio detection and ranging (RaDAR). LiDAR sensors emit light in the visible and infrared spectra and receive light reflected from an object, thereby obtaining a time of flight defined as the time taken for the light to be received after being emitted and reflected.

The distance to the object may be calculated using the tine of flight, and information about the position and physical structure of the object may be obtained by repeating the calculation using three-dimensional (3D) scanning. A device operating in this way is referred to as a terrestrial laser scanner (TLS).

With the recent increasing demand for nondestructive inspection in the field of semiconductor manufacturing, research into applying LiDAR technology to the manufacture of semiconductor devices has been conducted. However, limitations due to the resolution limit of the LiDAR technology of several tens of μm have occurred.

SUMMARY

One or more example embodiments provide a light detection and ranging (LiDAR)-based inspection device applicable to the manufacture of a semiconductor device.

According to an aspect of an example embodiment, there is provided a light detection and ranging (LiDAR)-based inspection device including an ultrafast pulse source configured to generate a first ultrafast pulse and a second ultrafast pulse each having a pulse width ranging from 1 fs to 100 fs, a stage configured to generate a gating signal by adjusting a distance of flight of the first ultrafast pulse, a dispersing device configured to generate a chirp signal, based on the second ultrafast pulse reflected from a specimen, the chirp signal including a plurality of pulses having different wavelengths, a nonlinear optical generator configured to generate a nonlinear optical signal based on the chirp signal and the gating signal, and a detector configured to detect the nonlinear optical signal, wherein the gating signal temporally overlaps with some of the plurality of pulses included in the chirp signal in the nonlinear optical generator.

According to another aspect of an example embodiment, there is provided a light detection and ranging (LiDAR)-based inspection device configured to monitor a correlation coefficient of a chirp signal and a gating signal, the chirp signal being reflected from a specimen, and the gating signal being coherent with the chirp signal and having a pulse width ranging from 1 fs to 100 fs, the LiDAR-based inspection device including a nonlinear optical generator configured to generate a nonlinear optical signal based on the chirp signal and the gating signal, a stage configured to adjust a distance of flight of the gating signal transmitted to the nonlinear optical generator, and a detector configured to detect the nonlinear optical signal.

According to another aspect of an example embodiment, there is provided a method of manufacturing a semiconductor device, the method including alternately stacking a plurality of insulating films and a plurality of sacrificial films on a wafer, forming channel holes passing through the plurality of insulating films and the plurality of sacrificial films, and obtaining a profile of the channel holes based on a light detection and ranging (LiDAR)-based inspection device, wherein the obtaining of the profile of the channel holes based on the LiDAR-based inspection device includes generating a first ultrafast pulse and a second ultrafast pulse respectively having a pulse width of 1 fs to 100 fs, the first ultrafast pulse and the second ultrafast pulse being coherent with each other, generating a chirp signal by causing a group velocity delay in the first ultrafast pulse reflected from a specimen, the chirp signal including a plurality of pulses having different wavelengths, generating a gating signal having a pulse width of 1 fs to 100 fs based on a time delay in the second ultrafast pulse, and generating a nonlinear optical signal based on the chirp signal and the gating signal.

BRIEF DESCRIPTION OF THE DRAWINGS

The above and/or other aspects and features of the present disclosure will become more apparent by describing in detail example embodiments thereof with reference to the attached drawings, in which.

DETAILED DESCRIPTION

Figure 1:
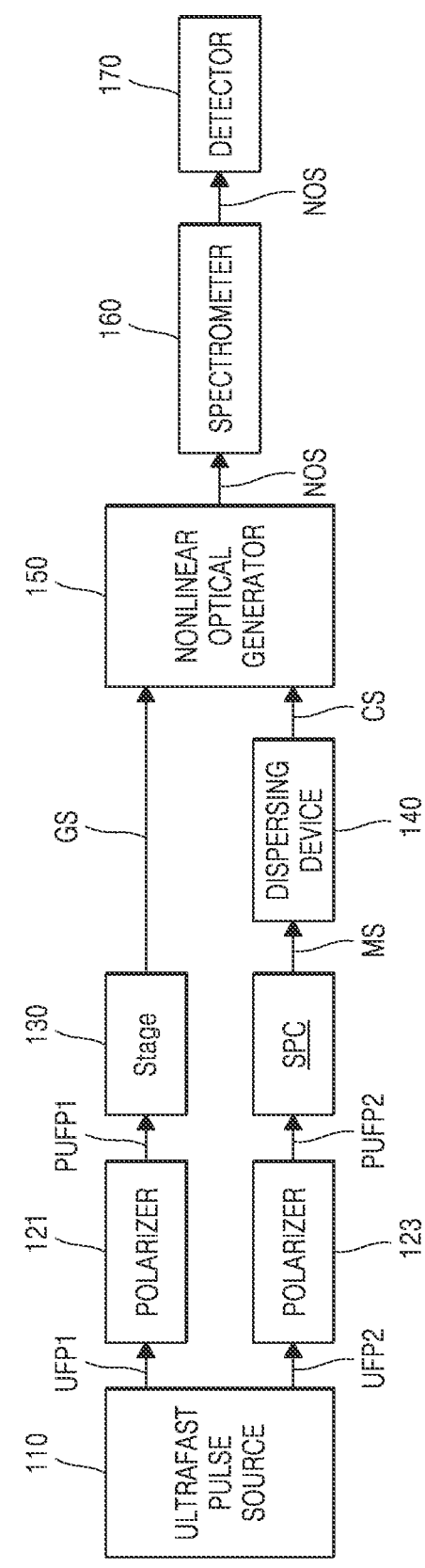
FIG. 1 is a diagram of a light detection and ranging (LiDAR)-based inspection device according to example embodiments.

Hereinafter, embodiments will be described in detail with reference to the accompanying drawings. In the drawing, like reference characters denote like elements, and redundant descriptions thereof will be omitted. Embodiments described herein are example embodiments, and the present disclosure is not limited thereto.

FIG. 1 is a diagram of a light detection and ranging (LiDAR)-based inspection device 100 according to example embodiments.

Referring to FIG. 1, the LiDAR-based inspection device 100 may include an ultrafast pulse source 110, a first polarizer 121 and a second polarizer 123, a stage 130, a dispersing device 140, a nonlinear optical generator 150, a spectrometer 160, and a detector 170.

The LiDAR-based inspection device 100 may nondestructively inspect a specimen SPC. For example, the specimen SPC may include a semiconductor wafer that has undergone a series of processes.

According to example embodiments, the LiDAR-based inspection device 100 may include an in-line LiDAR-based inspection device and inspect all specimens SPC that are manufactured. According to example embodiments, inspection of the specimen SPC may be performed based on the period of a reliability test of wafer processing equipment. For example, after the wafer processing equipment processes a preset number of specimens SPC or the lot including a preset number of specimens SPC, the specimens SPC or the lot of specimens SPC may be inspected.

According to example embodiments, the LiDAR-based inspection device 100 may perform an inspection based on LiDAR, without depending on the response speed of a photodiode.

According to example embodiments, the LiDAR-based inspection device 100 may have an ultrafine resolution of 100 nm or less by monitoring an autocorrelation coefficient of a gating signal GS having pulses and a chirp signal CS having chirped pulses coherent to each other. Accordingly, the LiDAR-based inspection device 100 may be used to inspect a workpiece in every semiconductor manufacturing process.

The ultrafast pulse source 110 may generate and emit a first ultrafast pulse UFP1 and a second ultrafast pulse UFP2. According to example embodiments, the first and second ultrafast pulses UFP1 and UFP2 may be coherent with each other. According to example embodiments, when the first and second ultrafast pulses UFP1 and UFP2 reach the same surface, the first and second ultrafast pulses UFP1 and UFP2 may form an interference pattern.

According to example embodiments, the ultrafast pulse source 110 may include a pulse generator and a splitter, which splits a pulse into the first and second ultrafast pulses UFP1 and UFP2. The ultrafast pulse source 110 may be implemented by free space optics or a photonic integrated circuit. When the ultrafast pulse source 110 is implemented by free space optics, the ultrafast pulse source 110 may include a plate splitter. When the ultrafast pulse source 110 is implemented by a photonic integrated circuit, the ultrafast pulse source 110 may include a Y splitter, a star splitter, a star coupler, a multi-mode interference, a Y branch splitter, a directional coupler, or the like.

The ultrafast pulse source 110 may control the wavelength bands and pulse widths of the first and second ultrafast pulses UFP1 and UFP2. The ultrafast pulse source 110 may control the wavelengths and pulse widths of the first and second ultrafast pulses UFP1 and UFP2 to enhance the sensitivity to a specimen SPC. According to example embodiments, the ultrafast pulse source 110 may include a tunable filter. As a non-limiting example, the tunable filter may have a turret structure including a plurality of filters.

The first and second ultrafast pulses UFP1 and UFP2 may include a component in a visible wavelength band. The first and second ultrafast pulses UFP1 and UFP2 may include a component in an infrared wavelength band. The wavelength of the first and second ultrafast pulses UFP1 and UFP2 may range from about 400 nm to about 1200 nm, but is not limited thereto.

The first and second ultrafast pulses UFP1 and UFP2 may have a very narrow pulse width. According to example embodiments, the pulse width of the first and second ultrafast pulses UFP1 and UFP2 may range from about 1 fs to about 100 fs. Here, the pulse width of the first and second ultrafast pulses UFP1 and UFP2 may correspond to a full width at half maximum.

The first polarizer 121 may polarize the first ultrafast pulse UFP1, and the second polarizer 123 may polarize the second ultrafast pulse UFP2. According to example embodiments, the first polarizer 121 and the second polarizer 123 may be configured to rotate. Accordingly, the polarization axis of each of the first and second polarizers 121 and 123 may be aligned with a direction, which is appropriate to maximize the sensitivity of the LiDAR-based inspection device 100, according to the pattern of the top layer of the specimen SPC.

The first ultrafast pulse UFP1 that has passed through the first polarizer 121 is output as a first polarized ultrafast pulse PUFP1, and the second ultrafast pulse UFP2 that has passed through the second polarizer 123 is output as a second polarized ultrafast pulse PUFP2.

The first polarized ultrafast pulse PUFP1 may reach the stage 130. The first polarized ultrafast pulse PUFP1 that has passed through the stage 130 is output as a gating signal GS. According to example embodiments, the stage 130 may perform precision driving to control the optical path of the gating signal GS.

The gating signal GS may include an ultrafast pulse. The pulse width of the gating signal GS may range from about 1 fs to about 100 fs.

According to example embodiments, the stage 130 may more precisely adjust the distance of flight (or the time of flight) of the gating signal GS. According to example embodiments, the stage 130 may precisely adjust a time taken for the gating signal GS to reach the nonlinear optical generator 150. According to example embodiments, the stage 130 may more precisely adjust a part of the chirp signal CS, which overlaps with the gating signal GS in the nonlinear optical generator 150.

The second polarized ultrafast pulse PUFP2 may reach the specimen SPC. The second polarized ultrafast pulse PUFP2 may be reflected from the specimen SPC. The second polarized ultrafast pulse PUFP2 that has been reflected from the specimen SPC is output as a measurement signal MS. The measurement signal MS may include information about the surface of the specimen SPC and information about the property of the surface of the specimen SPC.

The measurement signal MS may pass through the dispersing device 140. The dispersing device 140 may include a material having a high refractive index. As a non-limiting example, the dispersing device 140 may include optical fiber. The dispersing device 140 may cause the measurement signal MS to have a group velocity delay depending on a wavelength. For example, a first wavelength component of the measurement signal MS may travel faster than a second wavelength component having a shorter wavelength than a wavelength of the first wavelength, in the dispersing device 140.

According to example embodiments, the dispersing device 140 may adjust a group velocity delay to a random value. According to example embodiments, the dispersing device 140 may include a variable refractive index element or a photonic integrated circuit including a plurality of alternative paths.

For example, the variable refractive index element may include a quantum dot having a discrete energy level, a dielectric matrix surrounding the quantum dot, and an electron injector injecting an electron into the quantum dot through the dielectric matrix. According to another example embodiment, the variable refractive index element may correspond to a thermo-optic element, which has a refractive index varying with temperature, and include an electric heater, a core layer including a polymer, and a cladding layer including silica. According to another example embodiment, the variable refractive index element may include an optical fiber doped with ytterbium and a laser light source configured to apply a pump light of about 980 nm to the optical fiber.

According to example embodiments, when the measurement signal MS passes through the dispersing device 140, the chirp signal CS having a dispersed pulse having a different time delay according to a wavelength may be generated. The chirp signal CS may be a pulse train including a plurality of sequentially arriving pulses each having different amplitudes and wavelengths. For example, a visible red light component of a pulse of the chirp signal CS may reach the nonlinear optical generator 150 before a visible blue light component of a pulse of the chirp signal CS.

The gating signal GS and the chirp signal CS may reach the nonlinear optical generator 150. The chirp signal CS may partially and temporally overlap with the gating signal GS in the nonlinear optical generator 150. For example, some of the pulses of the chirp signal CS may be applied to the nonlinear optical generator 150 simultaneously with the gating signal GS.

The nonlinear optical generator 150 may generate a nonlinear optical signal NOS, based on some of the pulses of the chirp signal CS and the gating signal GS. As a non-limiting example, the nonlinear optical generator 150 may generate the nonlinear optical signal NOS, based on the gating signal GS and the chirp signal CS, by using second harmonic generation (SHG). However, embodiments are not limited thereto. For example, the nonlinear optical generator 150 may generate the nonlinear optical signal NOS using various nonlinear optical phenomena such as second, third, fourth, and higher nonlinear optical phenomena.

Here, examples of the second nonlinear optical phenomenon may include an optical parametric process.

Examples of the third nonlinear optical phenomenon may include third harmonic generation (THG), third-order sum frequency generation (TSFG), four-wave mixing (FWM), stimulated Raman scattering (SRS), optical Kerr effect (OKE), Raman induced Kerr effect (RIKE), stimulated Rayleigh scattering, stimulated Brillouin scattering (SBS), stimulated Kerr scattering, stimulated Rayleigh-Bragg scattering, stimulated Mie scattering, self-phase modulation (SPM), cross phase modulation (XPM), optical-field induced birefringence, and electric-field induced SHG.

Examples of the fourth or higher nonlinear optical phenomena include hyper-Raman scattering, hyper-Rayleigh scattering, and coherent anti-Stokes hyper-Raman scattering.

LiDAR inspection is described in detail below with reference to FIGS. 1 and 2.

Figure 2:
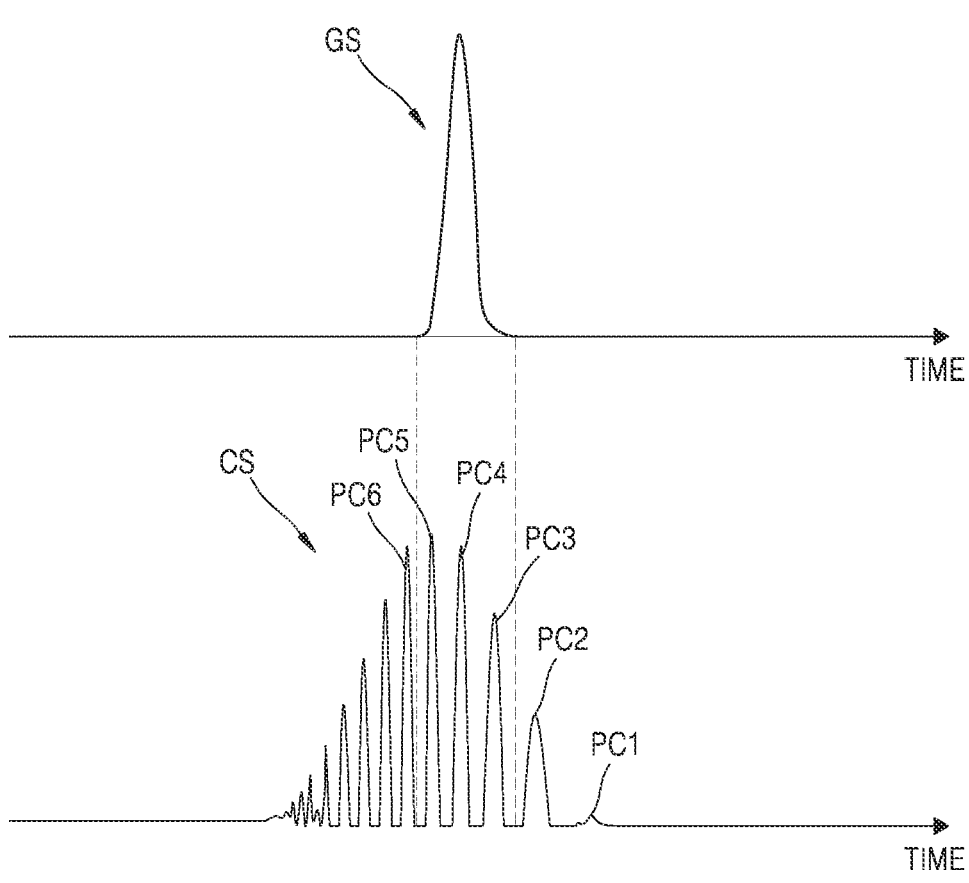
FIG. 2 illustrates a gating signal and a chirp signal that reached a nonlinear optical generator.

FIG. 2 illustrates the gating signal GS and the chirp signal CS, which have reached the nonlinear optical generator 150.

Referring to FIGS. 1 and 2, the gating signal GS that has reached the nonlinear optical generator 150 may temporally overlap with some pulse components PC3, PC4, and PC5 among pulse components PC1, PC2, PC3, PC4, PC5, PC6, . . . of the chirp signal CS that has reached the nonlinear optical generator 150. Among the pulse components PC1, PC2, PC3, PC4, PC5, PC6, . . . , leading ones may have longer wavelengths than following ones. For example, the wavelength of the pulse component PC1 may be longer than the wavelength of the pulse component PC2, and the wavelength of the pulse component PC2 may be longer than the wavelength of the pulse component PC3.

Because the gating signal GS originates in the first ultrafast pulse UFP1 and the chirp signal CS originates in the second ultrafast pulse UFP2, the gating signal GS may coherent with each of the pulse components PC1, PC2, PC3, PC4, PC5, PC6, . . . of the chirp signal CS. Because the chirp signal CS includes wavelength components of the result of dispersion of the first ultrafast pulse UFP1, the gating signal GS may include wavelength components respectively corresponding to the pulse components PC1, PC2, PC3, PC4, PC5, PC6, . . . of the chirp signal CS.

Accordingly, the gating signal GS and a part of the chirp signal CS may interfere with each other in the nonlinear optical generator 150. For example, in an example shown in FIG. 2, the nonlinear optical generator 150 may generate the nonlinear optical signal NOS, based on the pulse components PC3, PC4, and PC5 of the chirp signal CS, which temporally overlap with the gating signal GS. A nonlinear optical signal based on the pulse components PC1, PC2, PC6, . . . of the chirp signal CS, which do not temporally overlap with the gating signal GS, may not be generated.

Accordingly, the gating signal GS may perform sampling such that some of the pulse components PC1, PC2, PC3, PC4, PC5, PC6, . . . of the chirp signal CS are selected and output as the nonlinear optical signal NOS.

According to example embodiments, the stage 130 may drive the gating signal GS to scan the chirp signal CS. For example, when the specimen SPC is inspected, a plurality of chirp signals CS and a plurality of gating signals GS may sequentially reach the nonlinear optical generator 150, and the stage 130 may adjust a time of flight (or a distance of flight) of each gating signal GS such that the gating signals GS respectively scan different parts among the pulse components PC1, PC2, PC3, PC4, PC5, PC6, . . . of the chirp signals CS that sequentially reach the nonlinear optical generator 150. Consequently, the pulse components PC1, PC2, PC3, PC4, PC5, PC6, . . . of the chirp signals CS, which overlap with the gating signals GS, may form the entirety of a chirp signal CS.

The nonlinear optical signal NOS generated based on the gating signal GS and the pulse components PC3, PC4, and PC5 may include information about a time of flight (or a distance of flight) of the pulse components PC3, PC4, and PC5 and property corresponding to the surface of the specimen SPC. The information is included in the pulse components PC3, PC4, and PC5.

According to related art, a LiDAR-based inspection device, which is of a terrestrial laser scanner (TLS) type, measures a distance to an object by measuring a difference in a rising edge value between a start pulse and a stop pulse using an external clock having a high bandwidth. In this case, a maximum measurement error $\Delta_M$ is defined by the following Equation 1.

$$\Delta_M = c \cdot \frac{T_0}{2} \qquad \text{[Equation 1]}$$

Here, "c" is the speed of light, and $T_0$ is the period of the external clock. The response speed of an existing photodetector having the highest performance is about several tens of ps, and accordingly, an error in a time of flight (or a distance of flight) is about several tens of ps, and a maximum measurement error (i.e., a resolution limit) based on the time of flight is about several mm.

According to example embodiments, the pulse components PC1, PC2, PC3, PC4, PC5, PC6, . . . of the chirp signal CS may be sampled based on the gating signal GS, which is originated by the ultrafast pulse source 110, instead of an external clock. At this time, the gating signal GS has a time of flight (or a distance of flight) that is precisely controlled by the stage 130. Accordingly, the LiDAR-based inspection device 100 may more precisely determine the time of flight (or the distance of flight) of the pulse components PC3, PC4, and PC5.

A maximum error in the time of flight (or the distance of flight) of the pulse components PC3, PC4, and PC5 may be substantially the same as the pulse width of the gating signal GS. A maximum error in the time of flight (or the distance of flight) of the pulse components PC3, PC4, and PC5 may range from about 1 fs to about 100 fs. Accordingly, the resolution of inspection based on the nonlinear optical signal NOS generated from the pulse components PC3, PC4, and PC5 may be about 100 nm or less, and therefore, the LiDAR-based inspection device 100 may be applied to the manufacture of a semiconductor device.

The nonlinear optical signal NOS may reach the spectrometer 160. The spectrometer 160 may direct components included in the nonlinear optical signal NOS into different directions according to wavelengths. As a non-limiting example, the spectrometer 160 may include a grating. According to example embodiments, the spectrometer 160 may direct the components of the nonlinear optical signal NOS such that components having different wavelengths reach different pixels. As a result, the resolution of the LiDAR-based inspection device 100 may be further enhanced.

For example, when three pulse components PC3, PC4, and PC5 are sampled as shown in FIG. 2, nonlinear optical signals NOS respectively derived from the three pulse components PC3, PC4, and PC5 may be directed by the spectrometer 160 into different directions from one another. According to example embodiments, the spectrometer 160 may enhance the resolution of the LiDAR-based inspection device 100 by separating the pulse components PC3, PC4, and PC5.

According to example embodiments, the detector 170 may be configured to generate, from the nonlinear optical signals NOS, an electrical signal about the three-dimensional (3D) structure and composition of the specimen SPC.

According to example embodiments, the detector 170 may include a plurality of photodiodes arranged in an array. According to example embodiments, the photodiodes may have different energy band gaps according to wavelength bands sensed thereby. According to example embodiments, the photodiodes may have the same energy band gap.

According to example embodiments, the detector 170 may include a charge-coupled device (CCD) camera or a complementary metal-oxide-semiconductor (CMOS) image sensor. When the detector 170 is a CCD camera or a CMOS image sensor, pixels of the detector 170 may respectively correspond to different wavelength components of the nonlinear optical signals NOS.

According to example embodiments, the electrical signal generated by the detector 170 may include information about a time of flight (or the distance of flight) from the surface of the specimen SPC and information about the reflectance (or absorption rate) of the surface of the specimen SPC.

The LiDAR-based inspection device 100 may include a controller, which controls electronic elements and optical elements, and a processor, which analyzes an electrical signal generated by a detector. The controller and the processor may be implemented by hardware, firmware, software, or a combination thereof. For example, the controller and the processor may include a computing device such as a workstation computer, a desktop computer, a laptop computer, or a tablet computer. The controller and the processor may include a simple controller, a microprocessor, a complex processor such as a central processing unit (CPU) or a graphics processing unit (GPU), a processor configured by software, or dedicated hardware or firmware. For example, the controller and the processor may be implemented by a general-use computer or an application-specific hardware component such as a digital signal processor (DSP), a field programmable gate array (FPGA), or an application-specific integrated circuit (ASIC).

According to some example embodiments, the operations of the controller and the processor may be embodied as instructions, which are stored in a machine-readable medium and may be read and executed by at least one processor. Here, the machine-readable medium may include a mechanism for storing and/or transmitting information in a form readable by a machine (e.g., a computing device). Examples of the machine-readable medium may include read-only memory (ROM), random access memory (RAM), magnetic disk storage media, optical storage media, flash memory devices, electrical, optical or acoustic or other types of wave signals (e.g., carriers, infrared signals, digital signals, etc.), and other signals.

Firmware, software, routines, and/or instructions for performing the operations of the controller and the processor, which are described above, or processes, which are described below, may be configured. For example, the controller may be implemented by software, which is configured to generate a signal for controlling the oscillation of the ultrafast pulse source 110, a signal for controlling the alignment of the polarization axis of each of the first and second polarizers 121 and 123, and a signal for controlling the driving of the stage 130. The processor may be implemented by software, which is configured to perform a series of operations for determining the three-dimensional (3D) structure and composition of the specimen SPC from an electrical signal generated by the detector 165. The above-described operations of the controller and the processor may be caused by a computing device, a processor, or other devices executing firmware, software, routines, and instructions.

Figure 3:
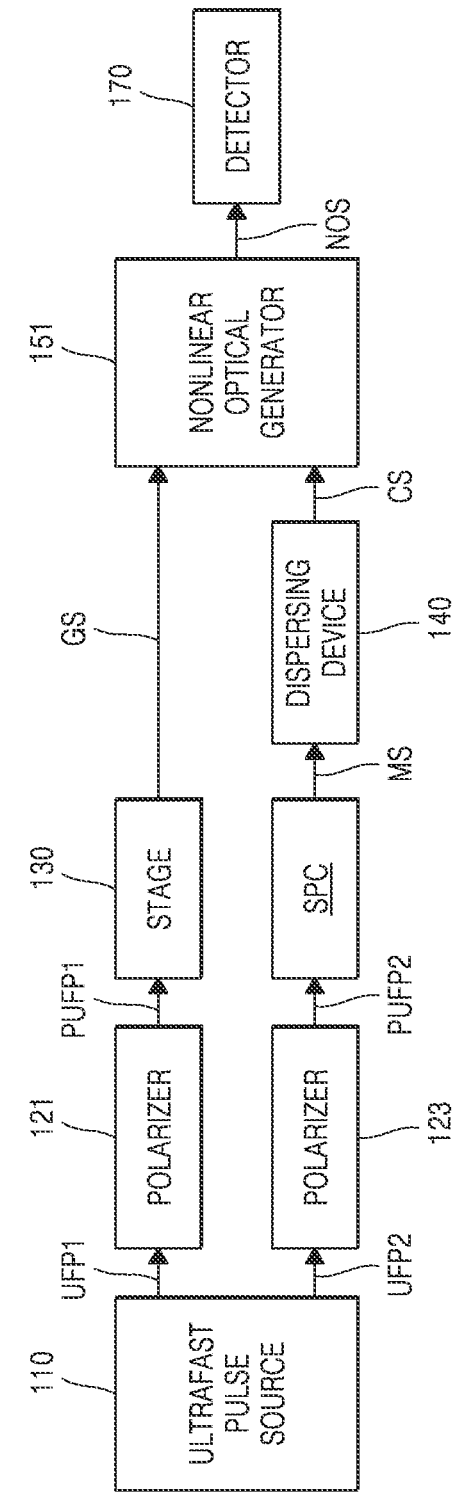
FIG. 3 is a diagram of a LiDAR-based inspection device according to example embodiments.

FIG. 3 is a diagram of a LiDAR-based inspection device 101 according to example embodiments.

Referring to FIG. 3, the LiDAR-based inspection device 101 may include the ultrafast pulse source 110, the first and second polarizers 121 and 123, the stage 130, the dispersing device 140, a nonlinear optical generator 151, and the detector 170.

The ultrafast pulse source 110, the first and second polarizers 121 and 123, the stage 130, the dispersing device 140, and the detector 170 are substantially the same as those described with reference to FIGS. 1 and 2. Therefore, redundant descriptions thereof will be omitted, and descriptions below will be focused on differences.

The nonlinear optical generator 151 in FIG. 3 may generate the nonlinear optical signal NOS and also separate the nonlinear optical signal NOS, and accordingly, the spectrometer 160 in FIG. 1 may be omitted.

According to example embodiments, the nonlinear optical generator 151 may include a crystalline layer having a thickness of about 0.1 mm to about 10 mm. According to example embodiments, when the nonlinear optical generator 151 includes a crystalline layer having a thickness of about 0.1 mm to about 10 mm, the nonlinear optical generator 151 may separate the nonlinear optical signal NOS. According to example embodiments, the nonlinear optical generator 151 also acts as a spectrometer, and accordingly, the LiDAR-based inspection device 101 may be implemented using fewer elements.

Figure 4:
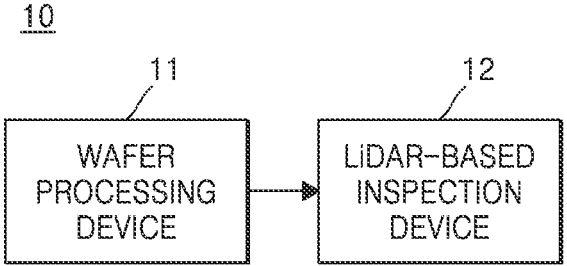
FIG. 4 is a block diagram of a system including a LiDAR-based inspection device, according to example embodiments.

FIG. 4 is a block diagram of a system 10 including a LiDAR-based inspection device 12, according to example embodiments.

According to example embodiments, the system 10 may include a wafer processing device 11 and the LiDAR-based inspection device 12.

The system 10 may process a wafer. Wafer processing may include various processes to form a semiconductor device on a wafer. For example, wafer processing may include ion doping, oxidation for forming an oxide film, spin coating, lithography including exposure and development, thin film deposition, dry etch, wet etch, metalization, etc. According to example embodiments, wafer processing may include forming a high-aspect ratio structure on a wafer using ion etching. According to example embodiments, wafer processing may include forming a channel hole in a plurality of insulating films and sacrificial films, which alternate with each other on a wafer.

Wafer processing may be performed by the wafer processing device 11. For example, the wafer processing device 11 may include a stepper or scanner lithography tool, dry/wet etching equipment, plasma etching equipment, clearer equipment, plasma asher equipment, polishing equipment such as chemical-mechanical polishing (CMP) equipment, ion-implementation equipment, physical vapor deposition (PVD) equipment, chemical vapor deposition (CVD) equipment, atomic layer deposition (ALD) equipment, and annealing equipment.

The wafer processed by the wafer processing device 11 may be inspected by the LiDAR-based inspection device 12. The LiDAR-based inspection device 12 may check a 3D structure and a composition, which are formed on the wafer. The LiDAR-based inspection device 12 may be one of the LiDAR-based inspection devices 100 and 101 described with reference to FIGS. 1 and 3.

According to example embodiments, the system 10 includes an in-line LiDAR-based inspection device and may thus monitor wafer processing in real time or in a preset reliability test period. Accordingly, causes of defects in the manufacture of semiconductor devices may be identified early, and a yield may be increased.

Figure 5:
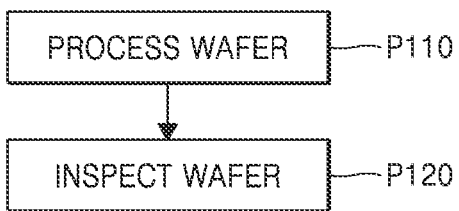
FIG. 5 is a flowchart of a method of manufacturing a semiconductor device, according to example embodiments.

FIG. 5 is a flowchart of a method of manufacturing a semiconductor device, according to example embodiments.

Referring to FIGS. 4 and 5, a wafer may be processed using the wafer processing device 11 in operation P110. For example, when the wafer processing device 11 corresponds to CVD equipment, wafer processing may include alternately stacking, on the wafer, a plurality of insulating films including silicon oxide and a plurality of sacrificial films including silicon nitride. According to another example embodiment, when the wafer processing device 11 corresponds to plasma etching equipment, wafer processing may include forming a channel hole, which vertically passes through a plurality of insulating films and sacrificial films on the wafer.

The processed wafer may be inspected in operation P120. According to example embodiments, wafer inspection may include terrestrial laser scanning. According to example embodiments, wafer inspection may include determining the profile of channel holes, which are formed on the wafer, using the LiDAR-based inspection device 12. The wafer inspection using the LiDAR-based inspection device 12 has been described with reference to FIGS. 1 to 4. When the profile of channel holes are determined through the wafer inspection, defects such as tilting, bending, bowing, distortion, dimples, or chipping of channel holes may be inspected.

While example embodiments have been described with reference to the figures, it will be understood by those of ordinary skill in the art that various changes in form and details may be made therein without departing from the spirit and scope as defined by the following claims and their equivalents.

What is claimed is:

1. A light detection and ranging (LiDAR)-based inspection device comprising:
   an ultrafast pulse source configured to generate a first ultrafast pulse and a second ultrafast pulse each having a pulse width ranging from 1 fs to 100 fs;
   a stage configured to generate a gating signal by adjusting a distance of flight of the first ultrafast pulse;
   a dispersing device configured to generate a chirp signal, based on the second ultrafast pulse reflected from a specimen, the chirp signal comprising a plurality of pulses having different wavelengths;
   a nonlinear optical generator configured to generate a nonlinear optical signal based on the chirp signal and the gating signal; and
   a detector configured to detect the nonlinear optical signal,
   wherein the gating signal temporally overlaps with some of the plurality of pulses included in the chirp signal in the nonlinear optical generator.

2. The LiDAR-based inspection device of claim 1, wherein a time resolution of the LiDAR-based inspection device ranges from 1 fs to 100 fs.

3. The LiDAR-based inspection device of claim 1, wherein a spatial resolution of the LiDAR-based inspection device ranges from 1 nm to 100 nm.

4. The LiDAR-based inspection device of claim 1, wherein the first ultrafast pulse and the second ultrafast pulse are coherent with each other.

5. The LiDAR-based inspection device of claim 1, wherein the chirp signal and the gating signal are coherent with each other.

6. The LiDAR-based inspection device of claim 1, wherein the LiDAR-based inspection device is configured to inspect the specimen based on an autocorrelation coefficient of the chirp signal and the gating signal.

7. The LiDAR-based inspection device of claim 1, wherein the nonlinear optical generator is further configured to generate the nonlinear optical signal, based on the gating signal and some pulses, among the plurality of pulses included in the chirp signal, overlapping with the gating signal.

8. The LiDAR-based inspection device of claim 1, wherein the stage is further configured to adjust a distance of flight of the gating signal, and
   wherein the plurality of pulses included in the chirp signal overlap with the gating signal in a scanning method.

9. The LiDAR-based inspection device of claim 1, further comprising a first polarizer between the ultrafast pulse source and the stage, the first polarizer being configured to control a polarization direction of the first ultrafast pulse by driving a polarization axis.

10. The LiDAR-based inspection device of claim 1, further comprising a second polarizer between the ultrafast pulse source and the specimen, the second polarizer being configured to control a polarization direction of the second ultrafast pulse by driving a polarization axis.

11. The LiDAR-based inspection device of claim 1, further comprising a spectrometer between the nonlinear optical generator and the detector, the spectrometer being configured to separate the nonlinear optical signal based on wavelengths of components included in the nonlinear optical signal.

12. The LiDAR-based inspection device of claim 1, wherein the nonlinear optical generator comprises a crystal having a thickness of 0.1 mm to 10 mm, and wherein the nonlinear optical signal generated by the nonlinear optical generator is directed into different directions based on wavelengths of components included in the nonlinear optical signal.

13. The LiDAR-based inspection device of claim 1, wherein the detector comprises a plurality of pixels, and wherein components included in the nonlinear optical signal having different wavelengths reach each of the plurality of pixels.

14. The LiDAR-based inspection device of claim 1, wherein the dispersing device is further configured to adjust a group velocity difference.

15. The LiDAR-based inspection device of claim 1, wherein a pulse width of the gating signal ranges from 1 fs to 100 fs.

16. The LiDAR-based inspection device of claim 1, wherein a pulse width of the nonlinear optical signal ranges from 1 fs to 100 fs.

17. A light detection and ranging (LiDAR)-based inspection device configured to monitor a correlation coefficient of a chirp signal and a gating signal, the chirp signal being resulting from dispersion of a measurement signal that is output based on a ultrafast pulse reflected from a specimen, and the gating signal being coherent with the chirp signal and having a pulse width ranging from 1 fs to 100 fs, the LiDAR-based inspection device comprising:

a nonlinear optical generator configured to generate a nonlinear optical signal based on the chirp signal and the gating signal;

a stage configured to adjust a distance of flight of the gating signal transmitted to the nonlinear optical generator; and a detector configured to detect the nonlinear optical signal.

18. The LiDAR-based inspection device of claim 17, wherein the LiDAR-based inspection device is further configured to obtain a three-dimensional structure of the specimen.

19. The LiDAR-based inspection device of claim 17, wherein the LiDAR-based inspection device is further configured to obtain a composition of the specimen.

20. The LiDAR-based inspection device of claim 17, wherein the stage is further configured to select pulses, among a plurality of pulses included in the chirp signal, overlapping with the gating signal by adjusting the distance of flight of the gating signal based on a scanning method.

\*   \*   \*   \*   \*